US010431047B2

(12) United States Patent
Kolesov

(10) Patent No.: US 10,431,047 B2
(45) Date of Patent: Oct. 1, 2019

(54) DEVICE FOR HOLDING LOTTERY

(71) Applicant: Andrey Evgen'evich Kolesov, Moscow (RU)

(72) Inventor: Andrey Evgen'evich Kolesov, Moscow (RU)

( * ) Notice: Subject to any disclaimer, the term of this patent is extended or adjusted under 35 U.S.C. 154(b) by 121 days.

(21) Appl. No.: 15/127,728

(22) PCT Filed: Feb. 13, 2015

(86) PCT No.: PCT/RU2015/000090
§ 371 (c)(1),
(2) Date: Sep. 20, 2016

(87) PCT Pub. No.: WO2015/142215
PCT Pub. Date: Sep. 24, 2015

(65) Prior Publication Data

US 2017/0169652 A1 Jun. 15, 2017

(30) Foreign Application Priority Data

Mar. 21, 2014 (RU) ................................ 2014110722

(51) Int. Cl.
*A63F 9/24* (2006.01)
*A63F 13/00* (2014.01)
(Continued)

(52) U.S. Cl.
CPC ........... *G07F 17/329* (2013.01); *G07C 15/00* (2013.01); *G07C 15/001* (2013.01); *G07F 17/32* (2013.01);
(Continued)

(58) Field of Classification Search
None
See application file for complete search history.

(56) References Cited

U.S. PATENT DOCUMENTS 4,834,385 A * 5/1989 Jackson .................. A63F 7/048
273/144 A
6,824,463 B1 11/2004 Yamaguchi et al.
(Continued)

FOREIGN PATENT DOCUMENTS

EA 006282 B1 10/2005
EA 201000957 A1 1/2012
(Continued)

OTHER PUBLICATIONS

The International Search Report (ISR) with Written Opinion for PCT/RU2015/000090 dated Jun. 1, 2015, pp. 1-6.
(Continued)

*Primary Examiner* — Milap Shah
*Assistant Examiner* — Jason Pinheiro
(74) *Attorney, Agent, or Firm* — McDonnell Boehnen Hulbert & Berghoff LLP

(57) ABSTRACT

A lottery machine comprises: a plurality of rotatable cylinders, wherein each has a hole on its outer rim; a loading module, disposed above the plurality of rotatable cylinders, with ten rotatable sections arranged in an axial row, wherein each of the ten rotatable sections has a hole commensurate in size to the holes in the rotatable cylinders, wherein the loading module is laterally movable with respect to the rotatable cylinders such that the holes of the rotatable sections can be aligned with the holes of the rotatable cylinders; an inclined slot, disposed below the rotatable cylinders; an RFID reader at a distal end of the inclined slot; and a controller configured to align at least some of the holes of the ten sections of the loading module with the holes the rotatable cylinders based on input from the RFID reader.

2 Claims, 4 Drawing Sheets

(51) Int. Cl.

| | |
|---|---|
| ***G06F 17/00*** | (2019.01) |
| ***G06F 19/00*** | (2018.01) |
| ***G07F 17/32*** | (2006.01) |
| ***G07C 15/00*** | (2006.01) |

(52) U.S. Cl.
CPC ...... *G07F 17/3216* (2013.01); *G07F 17/3223* (2013.01); *G07F 17/3227* (2013.01)

(56) References Cited

U.S. PATENT DOCUMENTS

| | | | | |
|---|---|---|---|---|
| 2005/0037831 A1* | 2/2005 | Seelig | G07F 17/3213 463/17 |
| 2013/0299312 A1 | 11/2013 | Polleres | |

FOREIGN PATENT DOCUMENTS

| | | | |
|---|---|---|---|
| EA | 201001551 | A1 | 2/2012 |
| EP | 0826400 | A2 | 3/1998 |
| EP | 2665046 | A1 | 11/2013 |
| JP | 2008054993 | A | 3/2008 |
| RU | 2053827 | C1 | 2/1996 |
| RU | 7328 | U1 | 8/1998 |
| RU | 2117332 | C1 | 8/1998 |
| RU | 2005104971 | A | 8/2006 |
| RU | 90343 | U1 | 1/2010 |
| RU | 2419156 | C2 | 5/2011 |
| RU | 2010143479 | A | 5/2012 |

OTHER PUBLICATIONS

The International Search Report (ISR) with Written Opinion for PCT/RU2015/000089 dated May 13, 2015, pp. 1-8.
The International Preliminary Report on Patentability (IPRP) for PCT/RU2015/000090 dated Sep. 29, 2016, pp. 1-7.
The International Preliminary Report on Patentability (IPRP) for PCT/RU2015/000089 dated Sep. 29, 2016, pp. 1-8.
https://www.stoloto.ru/6x49/archive?from=22.08.2010&to=22.05.2012&firstDraw=26430&lastDraw=264798,mode=date (Aug. 2012), pp. 1-5.

* cited by examiner

DEVICE FOR HOLDING LOTTERY

The utility model relates to mass collective games and may be used to conduct different types of lotteries.

Known game is 'Sportloto' [1]. This game is conducted as follows: before the drawing, the participant acquires a special card used for participating in a particular game, and then marks at least one of the variants of the suggested winning numerical combination. The drawback of the game is the necessity to use special cards, send, store, collect and process them. This lottery is also infamous for restricting the rights of its participants, since in the drawing process the winning numbers may fall on indexes, which were not acquired. Thereby, in addition to the lottery participants with their unique numbers, the numbers acquired by no one participate in the drawing, thus reducing the chances of winning for those taking part in the game.

Also known is the game method of telephone lottery, whereby before the drawing the participants of the game register the drawing information by telephone, as well as their code designed to identify the participants after the drawing, in connection to which the participants of the game register the index consisting of non-repeating numbers [2].

The shortcoming of this lottery is that it restricts the rights of participants, since in the drawing process the winning numbers may fall on the indices acquired by no one. Thereby, in addition to the lottery participants with their unique numbers, the numbers acquired by no one participate in the drawing, thus reducing the chances of winning for those taking part in the game.

Also known way to conduct a lottery where the participants of the game register the drawing information and their identification code after the drawing, whereas the index, consisting of numbers, letters and other characters, is registered by the participants for the drawing, which is different in a way that indexes consist of unique identification numbers related to a participant or acquired by the participant of the lottery for other purposes, and the participant claims the participation in the lottery using their unique number by agreeing to pay or by actual payment [3].

The drawback of the latter lottery is that it restricts the rights of participants, since in the drawing process the winning numbers may fall on the indices acquired by no one. Thereby, in addition to the lottery participants with their unique numbers, the numbers acquired by no one participate in the drawing, thus reducing the chances of winning for those taking part in the game.

The closest solution is a method to conduct a lottery [4], whereby its participants are informed about conducting a lottery, accept applications for participation in the lottery, the prize fund of the lottery is established, the winning of the prize fund and the issuance of prizes is conducted, which is different so that after start of the acceptance of the lottery participation applications, the participants of the lottery lodge with the organizer of the lottery by means of remote communication at least one application to participate in the lottery, the organizer of the lottery secures the acceptance and registration of the applications, and informs the participants on the number assigned to the participant's application that turns into a number of an electronic lottery ticket, then the drawing of the prize fund is conducted, while the process of identifying the winning numbers of the lottery tickets is done in at least two rounds, during the first round the lottery tickets are divided into groups according to the criteria known to the participants in advance, and during the second round—from the earlier distributed lottery ticket groups at least one group is randomly picked and the of the electronic tickets of this group become winning, and then the prizes are issued in accordance with the terms of the lottery. The criterion for dividing lottery tickets into groups within the context of one round is the moment of receiving of the application for participation by the organizer or the queue number of the electronic lottery ticket, or the number of applications for participation lodged by one participant of the lottery in the process of the lottery itself. At least one group of winning lottery tickets within the context of the other round is determined by any known means, including a drawing device (lototron). Television, telephone, internet, printed media are used as means of remote communication.

The drawback of this lottery is the absence of personalization of the participants, which allows wrongdoers having access to the ticket registration database to reveal the participant of the winning and to exert physical and mental pressure on him or her before accepting the winning in order to extort the prize or to direct the winning to the fraudster's account. This claimed method also fails to describe the process of establishing the winning lottery tickets, which cannot be implemented according to the aforesaid conditions, including use of the drawing device (lototron), for the following reasons: the game involves a determined number of tickets; when drawing the first and the last digits of the queue number, the drawing device (lototron) and other typical methods may issue any number from 0 to 9, although the actual value of the involved numbers may fall outside this interval; e.g. the total number of tickets taking part in the drawing may be 34565; thereby, the first number from 4 to 9, also the last number from 6 to 9 cannot be drawn by the drawing device (lototron); consequently, by establishing the winning tickets with the help of the above-mentioned means, the rights of the lottery participants are restricted, since in the drawing process the winning numbers may fail to match the acquired tickets.

Technical result of the utility model facilitates the conducting of the lottery by reducing the number of documents to be transacted, and by eliminating the need for participants to memorize information, easing the process of entering the game, and the resulting increase in the number of participants, and a possibility to conduct a multi-staged lottery. Also the technical result is the elimination of restrictions on the rights of participants of the lottery and increasing the chances to win, by eliminating the tickets, which were not acquired, from the game.

The above-mentioned technical result is achieved through the device implementing the method of conducting a lottery, comprising of the drawing device (lototron) with number bearing balls, ball dropping chute, and a drawing machine consisting of at least one drum with a ball dropping hole adapted to retrieve balls randomly one by one through the said hole, comprising a processor with an attached storage medium or a microcontroller associated with the module for allocation of the balls to the drums, which is configured to load each of the drums with a numbered ball bearing specific number by command of the processor or microcontroller, and the ball drawing chute contains the RFID reader able to read the RFID tag inside of the drawn balls, and each of the balls inside the drawing machine (lototron) comprises RFID-tag corresponding to the number on the ball.

Preferably, the ball allocation module is configured to move with respect to the drawing drums and consists of ten sections, each of which is loaded with the numbered balls bearing numbers from 0 to 9, and each section is rotatable on a horizontal axis and comprises a hole larger than the diameter of the ball.

SHORT DESCRIPTION OF THE DRAWINGS

APPLICATION OF THE UTILITY MODEL

Figure 1:
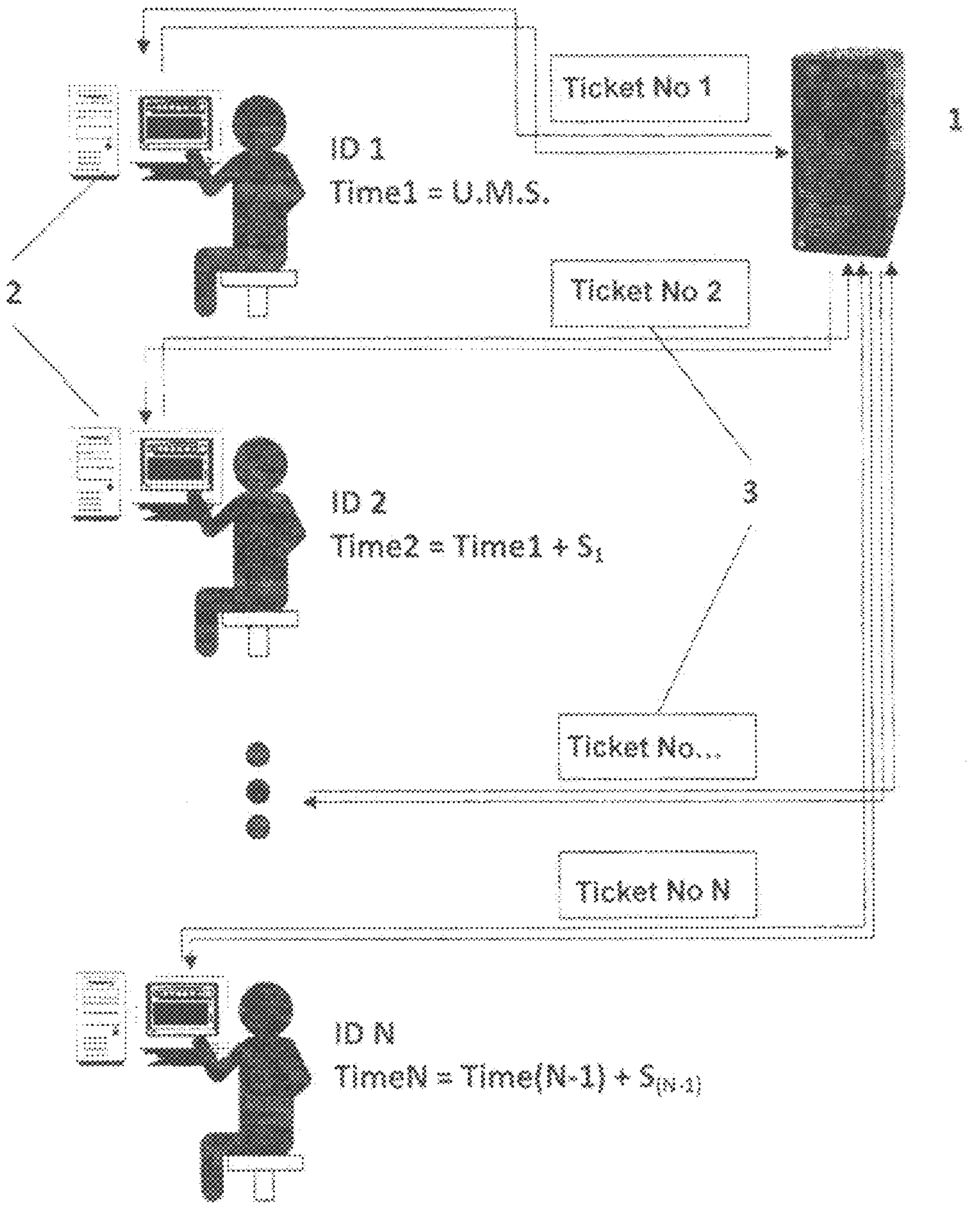
FIG. 1 shows the principle of creating ticket numbers at the moment of ticket purchase.

First we demonstrate how the claimed device is applied for conducting a lottery.

The lottery is conducted so that the participants become holders of certain drawing tickets, which are the simple sequential numbers assigned to each newly registered drawing ticket. In a lottery, the potential participants shall register their identification data on the lottery organizer's server website. The user data shall be correlated with the numbers assigned to the participant's application, which becomes the number of the electronic ticket for the drawing. The drawing of the prize fund is made only from within the numbers of registered applications.

A user shall lodge his or her lottery participation application and register it by paying a particular amount of money set for the game cycle. The number of lottery tickets acquired by one participant is unlimited. The payment of the contribution results in a civil-legal relationship, whereunder the participant is entitled to take part in the lottery and to claim the prize in case of winning.

The lottery is distinguished so that the drawing may be conducted in several levels (rounds). This means that for each level (round) the sum of prizes is different, e.g. for the main prize fund designed for the main drawing for the single ticket, the size of the win may be from 40% to 45% of the total prize fund. After conducting the drawing of the main prize fund, the remaining prize fund may be drawn based on special combinations of the participants' lottery ticket numbers, e.g. the drawing may involve tickets with at least three identical numbers 1, 2, 3 etc. in their queue number. For example, if the drawing involves the total number of 235567 tickets, the winning numbers of the secondary drawing will be those with at least three identical numbers matching the lotto ball dropping out of the device. Assuming that the ball with a number 7 has dropped out, the winning numbers will be: 777, 1777, 2777, . . . , 1777xx, where XX are any numbers from 00 to 67. These winning numbers share the remainder of the prize fund or a part of it and then one or more drawing rounds are conducted by analogy.

Similarly, a lottery may be conducted when selling transportation documents, e.g. railway or air tickets by using their serial numbers. In this case, at the moment of ticket sale the passenger claims their wish to take part in the drawing and the cashier registers the participation and refers the necessary attributes in the ticket with the help of the ticket printing machine, including the queue number of the ticket. In this case, the travel ticket remains with the user as a lottery ticket after being used for direct purposes as a travel ticket and shall form the basis to claim the prize.

The advantage of the claimed method of conducting a lottery is the simplicity of participation, without requiring the participant to memorize any information and no need to undertake any actions, except for the confirmation of the wish to participate, on the one hand, while conducting such a drawing lot allows increasing the attractiveness and competitiveness of the basic service provided to the user in any service sector, on the other hand.

It should be noted that the use of the claimed method and device are unlimited and can be implemented even on a small scale, for example, during the lottery at the family or club level, bigger event or forum, prize draws in retail shops or exhibitions.

When organizing small-scale lotteries, the users may not need to carry out registration of the identity, and just get coupons with numbers from the lottery organizer manually, which distributes coupons based on the conditions for granting them starting from the ticket with the number 1 and until the number N, which is issued to the last participant of the lottery. Then the organized shall ascertain the number, which shall be entered into the claimed device in order to start the drawing, based on the number N.

The device works as described below.

Figure 2:
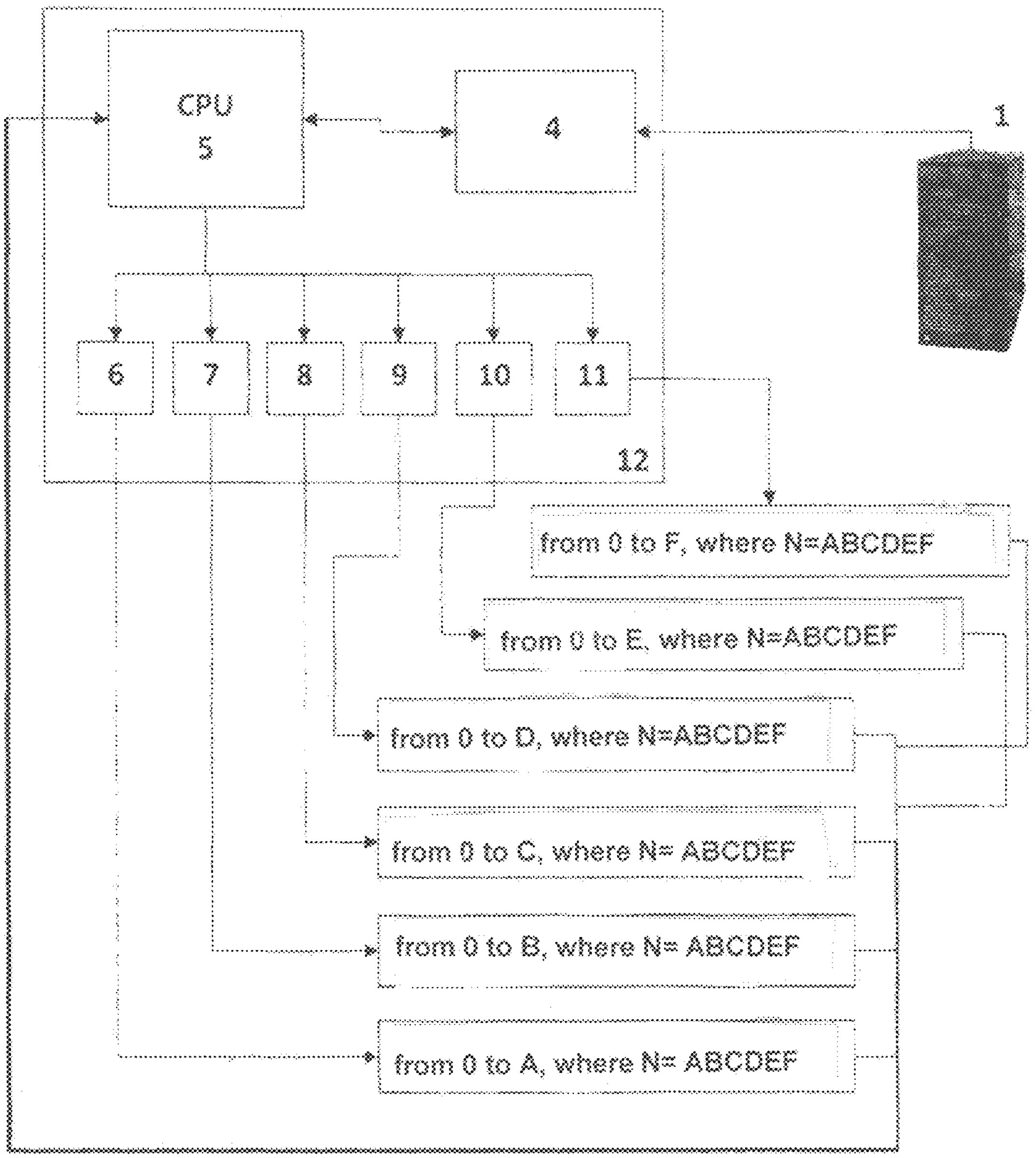
FIG. 2 shows the principle of creating numbered balls that can be drawn in the drawing device (lototron).

Users 2 register on the server 1 by entering their registration data. At the moment of ticket purchase the server 1 assigns a number to ticket 3 based on the moment of lodging the application. The number shall be assigned based on the queue of the lodged application (see FIG. 1). The number of lodged ticket purchasing applications matches the total number of combination variants of the drawing. I.e. if N tickets have been purchased, all numbers with N combinations shall take part in the drawing. Drawing lots is performed by the drawing machine 12 (see FIG. 2), which may be implemented based on a sample device (see FIG. 2). A processor or a micro-controller 5 is installed inside of the device 12. An information collector 4 may also be installed, saving the data sent by server 1 from the database, or the information on the numbers taking part in the drawing directly reaches the processor or the micro-controller 5.

If carried on a small scale to the small number of users, the lottery organizer may introduce a number N manually in the memory 4 of the device or transmits it via PC interface.

The start of operation of the drawing machine 12 depends on the combination of the digit, required to draw all possible combinations. E.g. if the total number of combinations N=ABCDEF, where A, B, C, D, E, F are any digits from 0 to 9, this means that the device shall roll six cylinders with the balls.

The processor or the micro-controller 5 triggers the loading—starting with the first the cylinder on the left, which is loaded with 6 balls with numbers from 0 to 3.

Figure 3:
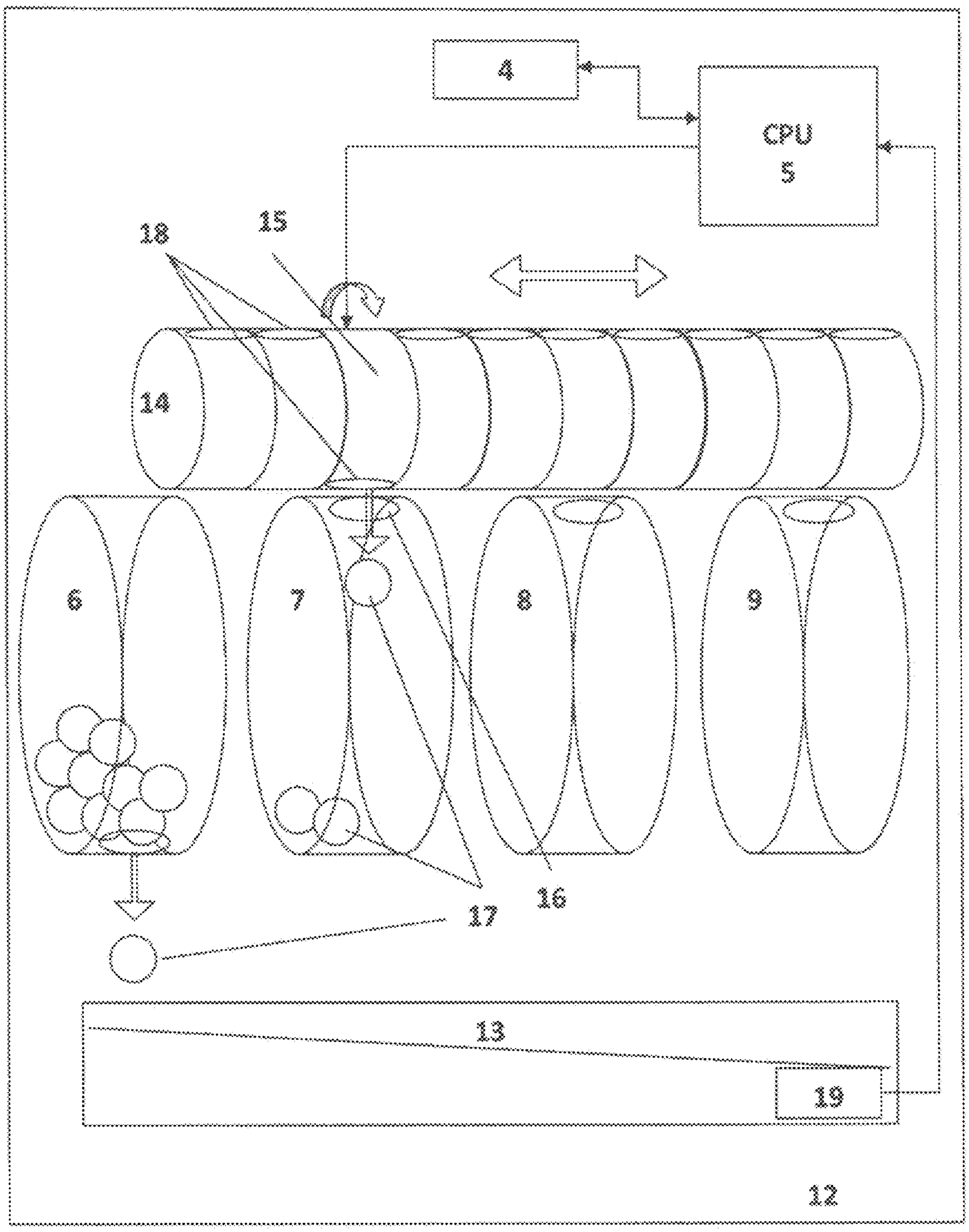
FIG. 3 shows the example of the device and its principle of operation.

The said loading may take place by means of the loading module 14 moving along the cylinders and loaded with balls 17 (see FIG. 3). The module 14 is divided into 10 sections, each of them contains balls respectively numbered from 0 to 9. When a ball 17 needs to be loaded into one of the cylinders 6, 7, 8, 9, module 14 approaches the respective section 15, the section moves around its axis and unloads one of the balls to the cylinder through the cavity 18, when the latter meets the loading cavity 16. When the cylinder contains all the balls with all the required numbers, it turns and spins the balls. Consequently, e.g. as can be seen from FIG. 3, the cylinder 6 is turned around with its cavity 16 down and only one ball 17 is unloaded there.

Figure 4:
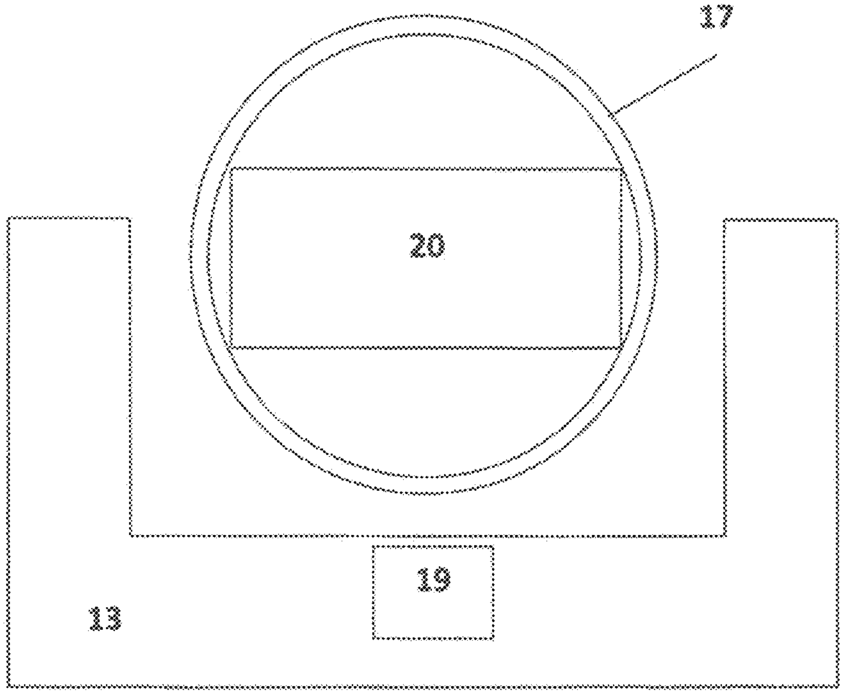
FIG. 4 shows the example of construction of the drawing balls and the slot (cut view).

After falling out of the cylinder, the ball 17 drops into a special inclined slot 13 and rolls down where it contacts the RFID reader 19. Each ball 17 contains RFID tags inside 20 (see FIG. 4) matching the ball numbers. When the reader 19 triggers the tag 20, the data is transferred to a processor 5 or a micro-controller, which then calculates the possible numerical combinations with which the balls may be loaded into the next cylinder. Subsequently, the operation after loading the cylinder with the balls and the drawing of the second ball is repeated by analogy for the next cylinder 7, then for the remaining cylinders 8, 9 etc., by drawing the winning lots with larger numbers, where necessary. At the end of the drawing, the balls 17 may be loaded back to the module 14 manually or automatically.

The described example of the drawing machine (lototron) is only one of the possible variations of its technical implementation. A drawing machine may be realized as an electronic screen with the numbers dropping out on the basis of random generation. A simple drawing machine is also possible by manually loading and distributing the balls. Each of these implementation options are covered under the claimed method.

For instance, 347853 combinations must be played on the basis of a drop of any number from 000001 to 347853. The balls numbered from 0 to 3 are loaded into the left cylinder. If numbers 0, 1, 2 drop out, all balls numbered from 0 to 9 are loaded into the next cylinder. If number 3 drops out, only the balls numbered from 0 to 4 are loaded into the next cylinder. The balls are loaded into the remaining cylinders by analogy in sequence from left to right. This is how every other ball is played for the entire row of the six-digit number. As a result, the single number from within the numbers from 000001 to 347853 is drawn, and becomes the winning lot.

INFORMATION SOURCES

1. Website: http://www.stoloto.ru/6x49
2. Patent RU2053827
3. Patent EA006282
4. Application RU2010143479 (published on Oct. 5, 2012)

The invention claimed is:

1. A device for conducting a lottery, comprising:

a ball dropping chute with an RFID reader;

a drawing machine including a plurality of cylinders, each respective cylinder with a single hole and adapted to: (i) receive balls through the single hole, (ii) spin so that the single hole is facing downward, and (iii) provide the received balls randomly one by one through the single hole, wherein the provided balls fall to the ball dropping chute;

a ball loading module configured for allocation of the balls to the cylinders of the drawing machine;

a controller configured to:

receive a target number, and control the ball loading module to load each of the cylinders with balls labelled with digits by way of RFID tags, wherein the balls are loaded into the cylinders such that each cylinder provides a different digit of a number less than or equal to the target number.

2. The device according to claim 1 characterized in that the ball loading module is moveable with respect to the cylinders and consists of ten sections, each of which is only loaded with balls labelled with a different one of digits from 0 to 9 respectively, and each section is rotatable on a horizontal axis and includes a hole larger than a diameter of the balls.

* * * * *